United States Patent [19]

Mikel

[11] Patent Number: 5,655,567

[45] Date of Patent: Aug. 12, 1997

[54] VALVE ASSEMBLY FOR TRANSMISSION

[75] Inventor: Steven A. Mikel, Farmington Hills, Mich.

[73] Assignee: Chrysler Corporation, Auburn Hills, Mich.

[21] Appl. No.: 485,562

[22] Filed: Jun. 7, 1995

[51] Int. Cl.$^6$ ................................................. F16K 15/00
[52] U.S. Cl. ........................... 137/513.3; 137/454.4; 137/513.7; 137/493.9
[58] Field of Search ................... 137/513.3, 454.4, 137/513.7, 493.9

[56] References Cited

U.S. PATENT DOCUMENTS

| | | |
|---|---|---|
| 1,257,011 | 2/1918 | Morris . |
| 2,550,373 | 4/1951 | Ortloff ................................. 137/513.3 |
| 3,360,087 | 12/1967 | Hilpert . |
| 3,602,347 | 8/1971 | Yamaguchi et al. . |
| 3,974,743 | 8/1976 | Ivey . |
| 3,992,898 | 11/1976 | Duell et al. ........................... 137/513.3 |
| 4,147,245 | 4/1979 | Folomin et al. . |
| 4,208,881 | 6/1980 | Brademeyer et al. ............... 137/513.7 |
| 4,554,844 | 11/1985 | Hamano . |
| 4,621,544 | 11/1986 | Re . |
| 4,934,218 | 6/1990 | Takase et al. . |
| 4,982,826 | 1/1991 | Holbrook . |
| 5,024,345 | 6/1991 | Deweerdt . |
| 5,186,021 | 2/1993 | Keller ................................... 137/513.3 |
| 5,507,468 | 4/1996 | Evans ................................... 137/513.3 |

FOREIGN PATENT DOCUMENTS 2098703  11/1982  United Kingdom ............... 137/513.7

Primary Examiner—Denise L. Ferensic
Assistant Examiner—Ramyar M. Farid
Attorney, Agent, or Firm—Roland A. Fuller, III

[57] ABSTRACT

A valve assembly for a transmission includes a valve cavity located in a flow passage and having first and second orifices spaced from one another and disposed at opposite ends of the cavity with sidewalls extending therebetween, a valve body disposed within the valve cavity and having a central passage extending through the valve body, the valve body and the cavity defining a plurality of positive flow passages between the sidewalls and the valve body through the valve cavity, the valve body being moveable within the valve cavity in response to the pressure of fluid flowing therethrough between a first position adjacent the first orifice such that fluid flows from the second orifice through the central passages in the positive flow passages and out the first orifice and a second position adjacent the second orifice such that the positive flow passages are sealed and restricted fluid flows from the first orifice through the central passage and out the second orifice.

18 Claims, 2 Drawing Sheets

VALVE ASSEMBLY FOR TRANSMISSION

BACKGROUND OF THE INVENTION

1. Field Of the Invention

The present invention relates generally to valve assemblies for transmissions and, more particularly, to a valve assembly disposed in a flow passage between a fluid reservoir and a clutch assembly in a transmission.

2. Description Of the Related Art

Transmissions are typically hydraulically operated through the use of several valves to direct and regulate the supply of fluid to frictional units. This regulated fluid supply causes either actuation or deactuation of the respective frictional units, such as clutches, for effecting gear changes in the transmission. The valves used for fluid control are typically spring loaded spool valves, spring loaded accumulators and ball check valves.

Generally, one way ball check valves are used in rotating clutches to relieve centrifugal pressure when the clutch is off and between a fluid reservoir and friction elements in transmissions. The latter type of ball check valves are located in flow passages through which positive fluid pressure flows for actuating the friction element in such a way as to allow fluid flow both through the ball seat and through a control orifice in one direction, but only through the control orifice in the opposite direction. While such ball check valves have worked well in the past, there is a need for improved shift characteristics when, for example, the transmission is shifted from underdrive to neutral. In this circumstance, fluid is dumped or vented from the clutch as it deactuates through the flow passage and past the ball check valve via the control orifice into the reservoir. If this deactuation occurs too quickly, the operator may hear and feel a "clunk" type noise as the clutch deactuates.

Further, such ball check valves may not be specifically suited to this application. Such ball check valve assemblies include castings to house the valves and these castings require much space. Thus, there is a need in the art for an improved valve assembly for use in certain flow passages in a transmission where space is very limited.

SUMMARY OF THE INVENTION

It is, therefore, one object of the present invention to provide a valve assembly for a transmission.

It is another object of the present invention to provide a valve assembly disposed in a flow passage between a fluid reservoir and a clutch assembly in a transmission.

To achieve the foregoing objects, the present invention is a valve assembly for a transmission. The valve assembly includes a valve cavity located in a flow passage having first and second orifices spaced from one another and disposed at opposite ends of the cavity and sidewalls extending therebetween. The valve assembly also includes a valve body disposed within the cavity and having a central passage extending through the valve body. The valve body and the cavity define a plurality of positive flow passages between the sidewalls and the valve body through the cavity. The valve body is moveable within the cavity in response to pressure of the fluid flowing therethrough between a first position adjacent the first orifice such that fluid flows from the second orifice through the central passage and the positive flow passages and out the first orifice and a second position adjacent the second orifice. When the valve body is in its second position, the positive flow passages are sealed and restricted fluid flows from the first orifice through the central passage and out the second orifice.

One advantage of the present invention is that a new valve assembly is provided for a transmission. Another advantage of the present invention is that the valve assembly is used in flow passages in the transmission between a fluid reservoir and a clutch. Yet another advantage of the present invention is that the valve assembly requires no special casting and is simple and therefore takes less investment for tooling changes than conventional ball check valve assemblies where a need exists for adding such a device into an existing transmission. A further advantage of the present invention is that the valve assembly improves shifting characteristics when a clutch is disengaged such as when the transmission is shifted from underdrive to neutral.

Other objects, features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
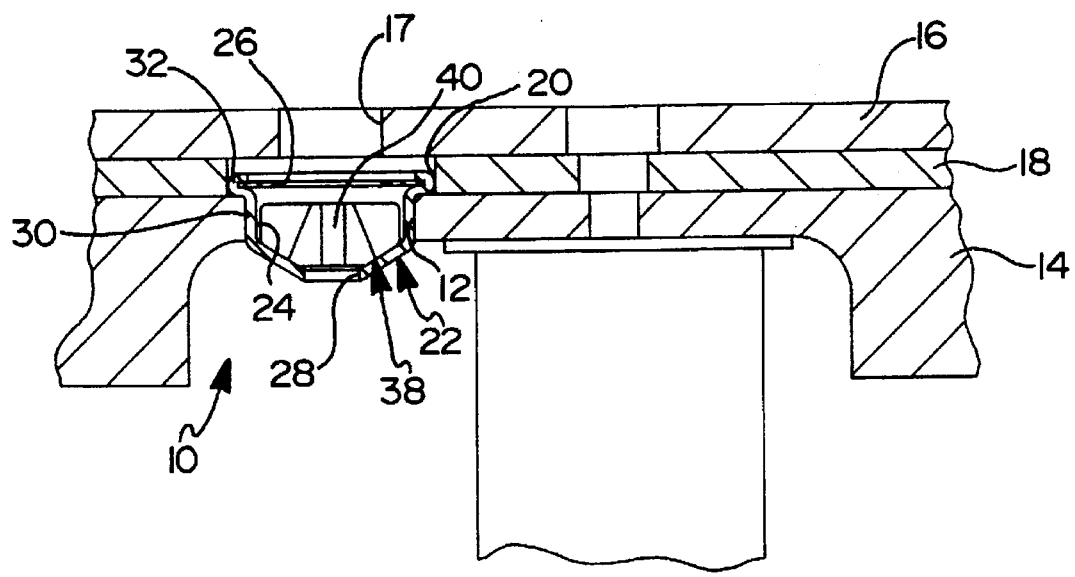
FIG. 1 is a fragmentary view of a valve assembly, according to the present invention, illustrated in operational relationship with a transmission.

Referring to FIG. 1, a valve assembly 10, according to the present invention, is located in a flow passage 12 for a transmission such as an automatic transmission for allowing unrestricted positive flow in one direction and restricted flow in the opposite direction. More specifically, the flow passage 12 extends between a fluid reservoir (not shown) and a clutch assembly (not shown) controlled by a manual valve (not shown). Such a transmission is disclosed in U.S. Pat. No. 4,875,391 to Leising et al.

As illustrated in FIG. 1, the flow passage 12 is located in a case wall 14 of the transmission beneath a solenoid assembly (not shown) as known in the art. The solenoid assembly includes a spacer plate 16 having an aperture 17 in fluid communication with the flow passage 12. The solenoid assembly also includes a solenoid gasket 18 disposed between the spacer plate 16 and the case wall 14 and having an aperture 20 to accommodate the valve assembly 10.

Figure 2:
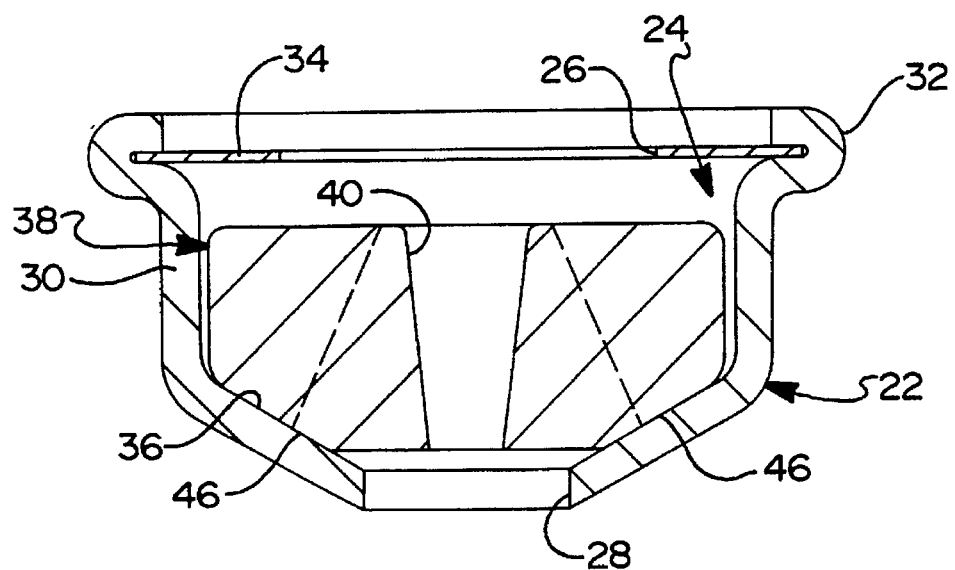
FIG. 2 is an enlarged view of the valve assembly of FIG. 1.
Figure 3:
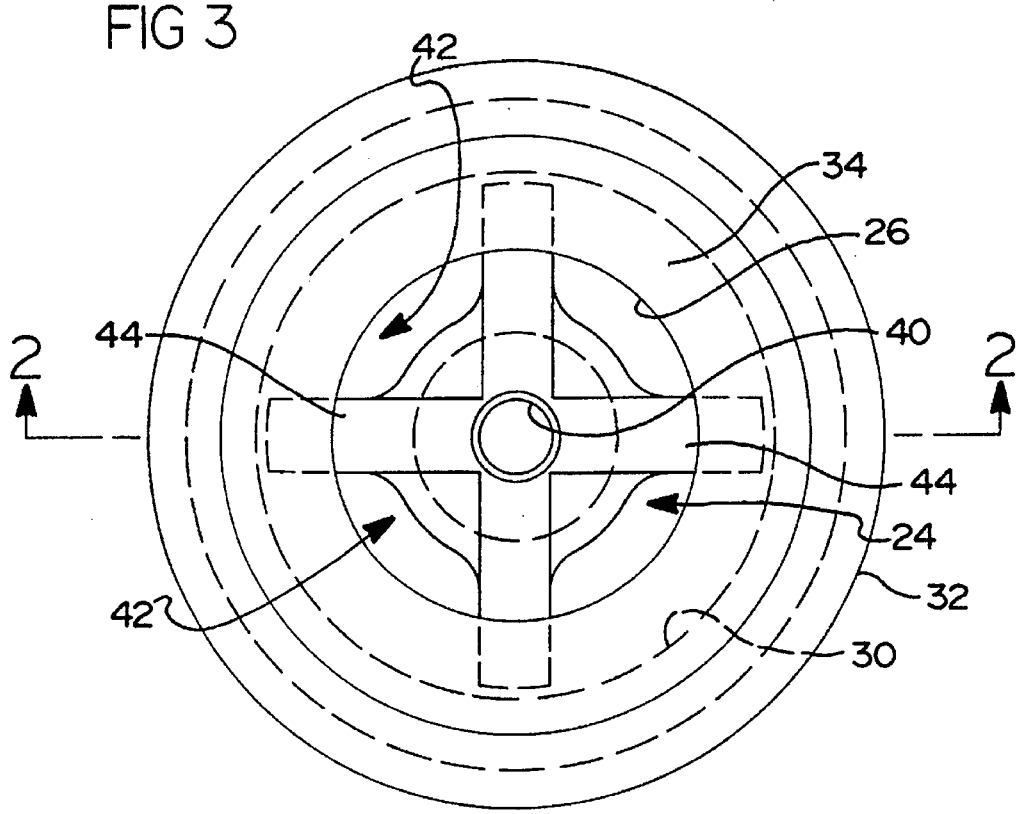
FIG. 3 is a plan view of the valve assembly of FIG. 1.

Referring to FIGS. 1 through 3, the valve assembly 10 includes an insert, generally indicated at 22, which defines a valve cavity 24. The valve cavity 24 has first and second orifices 26 and 28, respectively, spaced from one another and disposed at opposite ends of the cavity 24. Sidewalls 30 extend between the first and second orifices 26 and 28, respectively. The sidewalls 30 are substantially cylindrical in shape and circular in cross-section.

The insert 22 includes a retaining portion 32 disposed opposite the second orifice 28 and which is adapted to mount the valve assembly 10 in the flow passage 12. More specifically, the retaining portion 32 is in abutting contact with the top of the case wall 14 such that it is sandwiched between the case wall 14 and the spacer plate 16. The insert 22 also includes a washer 34 crimped to the insert 22 or otherwise fixed at the retaining portion 32. The washer 34 includes an aperture which defines the first orifice 26. The cavity 24 further includes a tapered valve seat 36 which is adjacent the second orifice 28.

Figure 4:
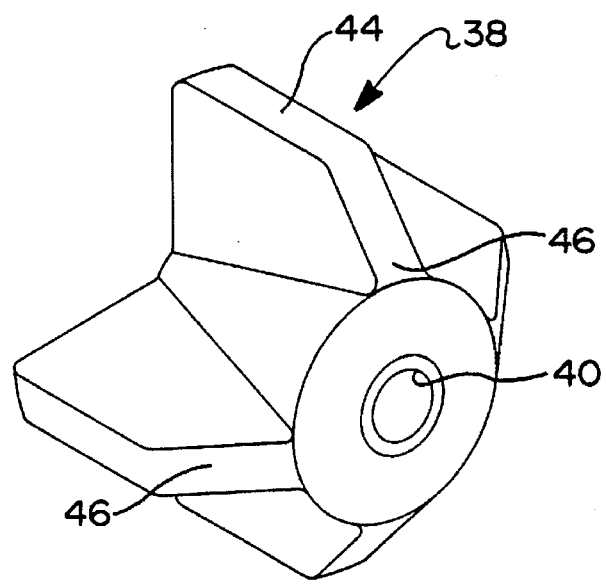
FIG. 4 is a perspective view of a portion of the valve assembly of FIG. 1.

The valve assembly 10 also includes a valve body, generally indicated at 38, which is disposed within the cavity 24 and has a central passage 40 extending through the valve body 38. The central passage 40 extends coaxially with the first and second orifices 26 and 28, respectively, and is tapered from the first orifice 26 to the second orifice 28. As illustrated in FIGS. 3 and 4, the valve body 38 and cavity 34 define a plurality of positive flow passages 42 between the sidewalls 30 and the valve body 38 through the cavity 24. Each of the positive flow passages 42 are spaced from one another about the valve body 38. The valve body 38 includes a plurality of ribs 44 extending radially outward So as to be adjacent the sidewalls 30 of the cavity 24 and disposed between the positive flow passages 42. More specifically, the valve body 38 includes four ribs 44 and the valve assembly 10 includes four positive flow passages 42 with each positive flow passage 42 extending between a corresponding pair of ribs 44 and about the valve body 38.

The valve body 38 is moveable within the cavity 24 in response to the pressure of the fluid flowing therethrough to a first position adjacent the first orifice 26 such that fluid flows from the second orifice 28 through the central passage 40 and the positive flow passages 42 and out the first orifice 26. Similarly, the valve body 38 is movable to a second position adjacent the second orifice 28 such that the positive flow passages 42 are sealed and restricted fluid flows from the first orifice 26 through the central passages 40 only and then out the second orifice 28. To this end, the valve body 38 includes a frusto-conical sealing surface 46 which cooperates with the tapered valve seat 36 when the valve body 38 is in the second position to seal the positive flow passages 42. Conversely, the ribs 44 are adapted for abutting contact with the washer 34 when the valve body 38 is in the first position.

In operation, and when, for example, the transmission is shifted from neutral to underdrive, the manual valve is actuated to provide relatively unrestricted fluid flow through the flow passage 12 and the valve assembly 10. The pressure generated by this fluid flow moves the valve body 38 to its first position adjacent the first orifice 26 such that fluid flows from the second orifice 28 through the central passage 40 as well as the positive flow passages 42 and out the first orifice 26 to actuate the underdrive clutch.

When, for example, the transmission is shifted from underdrive to neutral, the manual valve in the transmission is again moved such that the hydraulic fluid operative in the underdrive clutch is vented and is drained back through the fluid passage 12 to the fluid reservoir so as to disengage the clutch. However, unlike during the engaging of the underdrive clutch wherein there is relatively unrestricted fluid flow, the fluid flow past the valve assembly 10 is restricted because the valve body 38 is moved to its second position such that the positive flow passages 42 are sealed as the frusto-conical seating surface 46 cooperates with the tapered valve seat 36. In the second position, the valve assembly 10 allows fluid flow only through the tapered central passage 40. In this way, the fluid is drained from the underdrive clutch in a controlled manner to avoid unwanted noise or "clunking" of the transmission.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A valve assembly for a transmission comprising;

an insert mounted in a flow passage for a transmission and defining a valve cavity having first and second orifices spaced from one another and disposed at opposite ends of said valve cavity and sidewalls extending therebetween;

a valve body disposed within said valve cavity and having a central passage extending through said valve body and coaxially with said first and second orifices and tapered from said first orifice to said second orifice, said valve body and said valve cavity defining a plurality of positive flow passages between said sidewalls and said valve body through said valve cavity; and said valve body being moveable within said valve cavity in response to pressure of fluid flowing therethrough between a first position adjacent said first orifice such that fluid flows from said second orifice through said central passage and said positive flow passages and out said first orifice and a second position adjacent said second orifice such that said positive flow passages are sealed and restricted fluid flows from said first orifice through said central passage and out said second orifice.

2. A valve assembly as set forth in claim 1 wherein said valve cavity includes a tapered valve seat adjacent said second orifice, said valve body having a frusto-conical sealing surface which cooperates with said tapered valve seat when said valve body is in said second position to seal said positive flow passages.

3. A valve assembly as set forth in claim 1 wherein each of said positive flow passages are spaced from one another about said valve body.

4. A valve assembly as set forth in claim 1 wherein said sidewalls of said cavity are substantially cylindrical in shape and circular in cross-section.

5. A valve assembly as set forth in claim 1 wherein said valve body includes a plurality of ribs extending radially outward so as to be adjacent said sidewalls of said cavity and disposed between said positive flow passages.

6. A valve assembly as set forth in claim 5 including four ribs and four positive flow passages with each positive flow passage extending between a corresponding pair of ribs.

7. A valve assembly as set forth in claim 5 wherein said insert has a retaining portion disposed opposite said second orifice.

8. A valve assembly as set forth in claim 7 including a washer fixed at said retaining portion and having an aperture defining said first orifice, said ribs adapted for abutting contact with said washer when said valve body is in said first position.

9. A valve assembly as set forth in claim 8 wherein said washer is crimped to said insert at said retaining portion.

10. A valve assembly disposed in a flow passage between a fluid reservoir and a frictional unit in a transmission for allowing unrestricted positive fluid flow in one direction and restricted fluid flow in the opposite direction, said valve assembly comprising;

an insert mounted in the flow passage between a case wall of the transmission and a spacer plate of a solenoid assembly and defining a valve cavity having first and second orifices spaced from one another and disposed at opposite ends of said valve cavity and sidewalls extending therebetween;

a valve body disposed within said valve cavity and having a central passage extending through said valve body, said valve body and said valve cavity defining a plurality of positive flow passages between said sidewalls and said valve body through said valve cavity;

said valve body being moveable within said cavity in response to the pressure of the fluid flowing therethrough between a first position adjacent said first orifice such that fluid flows from said second orifice through said central passages and said positive flow passages and out said first orifice and a second position adjacent said second orifice such that said positive flow passages are sealed and restricted fluid flows from said first orifices through said central passage and out said second orifice;

said insert having a retaining portion disposed opposite said second orifice and a tapered valve seat adjacent said second orifice, said valve body having a frusto-conical sealing surface which cooperates with said tapered valve seat when said valve body is in said second position to seal said positive flow passages.

11. A valve assembly as set forth in claim 10 wherein said valve cavity includes a tapered valve seat adjacent said second orifice, said valve body having a frusto-conical sealing surface which cooperates with said tapered valve seat when said valve body is in said second position to seal said positive flow passages.

12. A valve assembly as set forth in claim 10 wherein each of said positive flow passages are spaced from one another about said valve body.

13. A valve assembly as set forth in claim 10 wherein said sidewalls of said valve cavity are substantially cylindrical in shape and circular in cross-section.

14. A valve assembly as set forth in claim 10 wherein said valve body includes a plurality of ribs extending radially outward so as to be adjacent said sidewalls of said cavity and disposed between said positive flow passages.

15. A valve assembly as set forth in claim 14 including four ribs and four positive flow passages with each positive flow passage extending between a corresponding pair of ribs.

16. A valve assembly as set forth in claim 14 including a washer fixed at said retaining portion and having an aperture which defines said first orifice, said ribs adapted for abutting contact with said washer when said valve body is in said first position.

17. A valve assembly as set forth in claim 10 wherein said central passage extends coaxially with said first and second orifices and is tapered from said first orifice to said second orifice.

18. A valve assembly disposed in a flow passage extending between a fluid reservoir and a clutch assembly in a transmission for allowing unrestricted positive flow in one direction and restricted flow in the opposite direction, said valve assembly comprising;

an insert mounted in the flow passage and defining a valve cavity having first and second orifices spaced from one another and disposed at opposite ends of said valve cavity and sidewalls extending therebetween, said valve cavity having a tapered valve seat adjacent said second orifice;

a valve body disposed within said valve cavity and having a central passage extending through said valve body and coaxially with said first and second orifices and tapered from said first orifice to said second orifice, said valve body and said valve cavity defining a plurality of positive flow passages spaced from one another about said valve body and between said sidewalls and said valve body through said valve cavity, said valve body having a plurality of ribs extending radially outward so as to be adjacent said sidewalls of said valve cavity and disposed between said positive flow passages, said valve body having a frusto-conical sealing surface which cooperates with said tapered valve seat when said valve body is in said second position to seal said positive flow passages; and said valve body being moveable within said valve cavity in response to the pressure of the fluid flowing therethrough between a first position adjacent said first orifice such that fluid flows from said second orifice through said central passage and said positive flow passages and out said first orifice and a second position adjacent said second orifice such that said positive flow passages are sealed and restricted fluid flows from said first orifice through said central passage and out said second orifice.

* * * * *